(12) United States Patent
Seto

(10) Patent No.: US 7,345,780 B2
(45) Date of Patent: Mar. 18, 2008

(54) IMAGE DATA MANAGEMENT SERVER, IMAGE PRINTING SERVER AND IMAGE SERVICE SYSTEM

(75) Inventor: Satoshi Seto, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 935 days.

(21) Appl. No.: 10/390,607

(22) Filed: Mar. 19, 2003

(65) Prior Publication Data
US 2003/0179405 A1 Sep. 25, 2003

(30) Foreign Application Priority Data
Mar. 19, 2002 (JP) ............................. 2002-076251

(51) Int. Cl.
*B41J 1/00* (2006.01)
(52) U.S. Cl. ...................... 358/1.15; 709/10; 709/203; 709/219
(58) Field of Classification Search .............. 358/1.15, 358/1.16, 1.6; 396/429; 710/33; 709/219, 709/217, 250, 203
See application file for complete search history.

(56) References Cited
U.S. PATENT DOCUMENTS

| | | | |
|---|---|---|---|
| 6,453,361 B1 * | 9/2002 | Morris | ....................... 709/250 |
| 7,194,253 B2 * | 3/2007 | Ritter et al. | ............. 455/414.3 |
| 7,206,781 B2 * | 4/2007 | Miyamoto et al. | ............ 707/10 |
| 2001/0021311 A1 * | 9/2001 | Mizumo | ..................... 396/429 |
| 2002/0059406 A1 * | 5/2002 | Tanaka et al. | ............. 709/223 |
| 2004/0010599 A1 * | 1/2004 | Otobe | ....................... 709/228 |
| 2005/0050043 A1 * | 3/2005 | Pyhalammi et al. | ........... 707/6 |
| 2007/0198286 A1 * | 8/2007 | Tomita | ......................... 705/1 |

FOREIGN PATENT DOCUMENTS

| | | |
|---|---|---|
| JP | 2001-345896 A | 12/2001 |
| JP | 2001-350999 A | 12/2001 |
| JP | 2002-27233 A | 1/2002 |

* cited by examiner

Primary Examiner—Kimberly A. Williams
(74) Attorney, Agent, or Firm—Sughrue Mion, PLLC

(57) ABSTRACT

Disclosed herein is an image managing systems for cellular phone users, wherein user registration and management is simplified. When a request for access is received from a cellular phone at a first storage means, the first storage means decodes the phone number of the accessing cellular phone, and a memory portion saves uploaded image data, to which a unique image ID has been assigned by an image ID issuing portion, in a memory area that has been assigned to the phone number. An editing portion of a service implementing portion sends data indicating the storage location (a URL address) and the image ID of an image data specified by the user to be stored permanently to a second storage means. The second storage means downloads, based on the URL address and image ID, and manages the target image data from the first storage means.

23 Claims, 7 Drawing Sheets

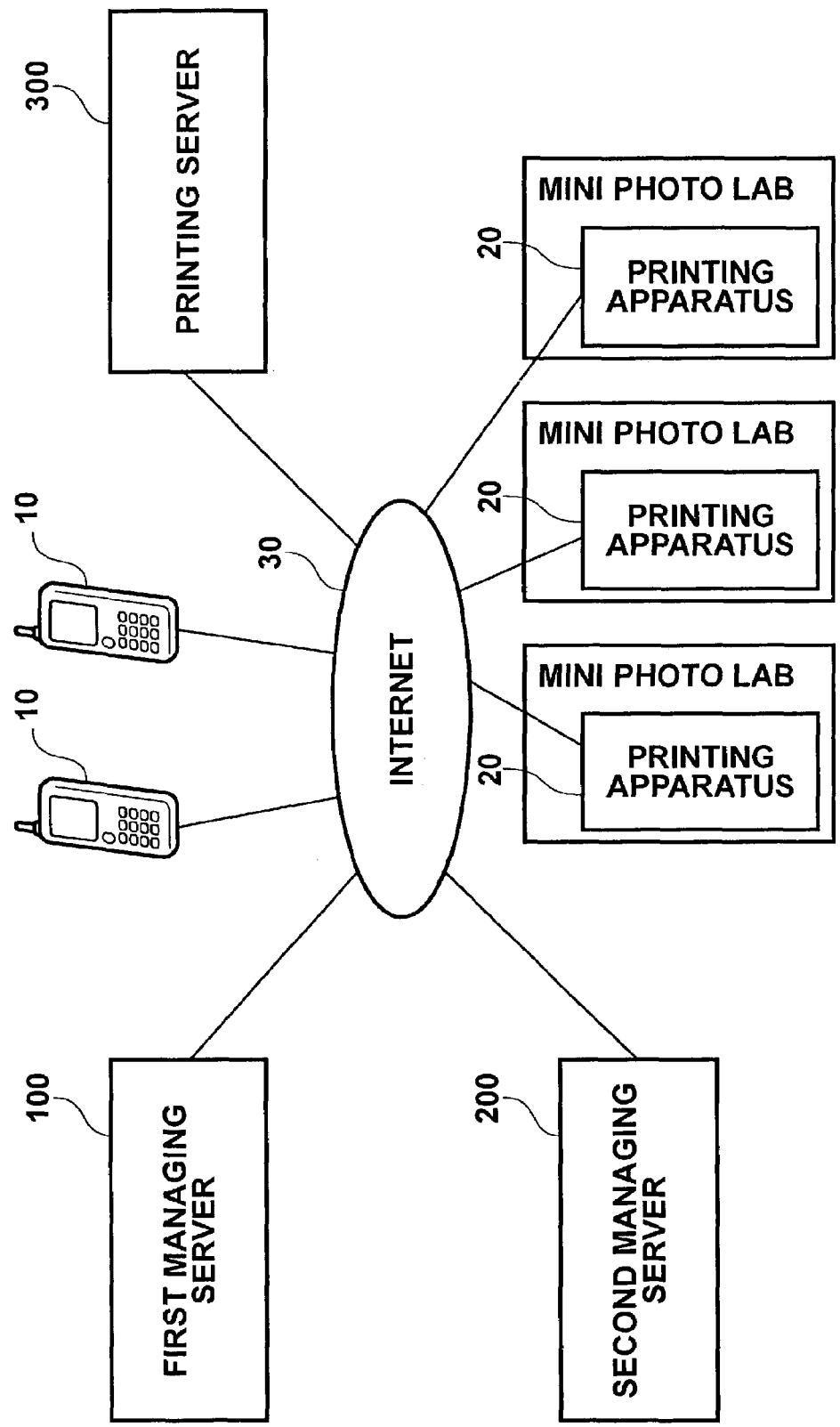

IMAGE DATA MANAGEMENT SERVER, IMAGE PRINTING SERVER AND IMAGE SERVICE SYSTEM

BACKGROUND OF THE INVENTION

1. Field of the Invention

The present invention relates to an image management sever, an image printing server and an image service system for use in a digital image service system provided over a communication network.

2. Description of the Related Art

Until the popularization of digital cameras, the conventional way of making prints employed a photosensitive film containing silver salts, such as silver halide film. Prints made utilizing silver halide photographic film have been used in many ways, such as being shown to friends to communicate the state of affairs when the picture was taken, being sent to acquaintances, being enlarged for use in decorating, being gathered in a photo album, etc. However, if prints made using silver halide photographic film are not maintained in an orderly fashion they can pile up quickly, and for cases in which a film negative or a print becomes lost, it becomes very difficult to recover the image. Further, even if painstaking measures are taken to properly organize prints and negatives, it is very time consuming to separate them into themes and categories. Still further, there are cases in which a user forgets to replace in its original place of storage a portion of negative film that has been taken out, whereby it becomes difficult to maintain the orderly arrangement thereof.

These circumstances and advances in technology have given rise to the practice of storing photographs as digital data using image data that has been obtained by scanning an image recorded on a negative film or obtained by photographing with a digital camera. However, it is often the case that digital image data such as that described above is stored on the hard disk of the personal computer of the user, and transferring the image data when a new computer is purchased is troublesome. Further, there are also cases in which the image data is stored on a storage medium such as a CD-R, producing a risk that image data will be lost if stored thereon for a long period of time due to deterioration of the condition of the storage medium. Still further, there are cases in which an apparatus for reproducing data stored on a certain type of media falls out of production due to its having become obsolescent upon being superceded by a newer technology, and therefore becomes unavailable. In this case, it becomes impossible to reproduce the data.

Therefore, image storage systems, wherein image data is transmitted over a network such as the internet to an image storing server for providing an image data storage service, have been proposed.

According to these image storage systems, image data transmitted directly from the user or from a printing laboratory at the request of the user and obtained by the image storing server is stored therein. It thereby becomes possible for the user to access the aforementioned image storage server by use of a terminal such as a personal computer to peruse the stored image data, and so on. Among such systems is an image data management system, as described in U.S. patent application Ser. No. 10/242,770, which is capable of efficiently managing image data, and also of carrying out print commands for making prints, etc. By use of this system, once image data has been stored in the image data management server, a user can peruse the image data, perform various processes such as organizing the image data, etc. Further, the user can also set printing conditions (e.g. the printing laboratory that is to perform the printing, the print size, type of printing paper, number of prints, and so on), whereby a print order for desired image data can be carried out. The image managing server causes the specified printing laboratory to print out the images in accordance with the printing conditions set by the user, whereby the user can obtain prints corresponding to the desired specifications.

Meanwhile, the functions of portable phones are rapidly increasing, along with the recent prevalence thereof. Among these portable phones are models equipped with cameras. It has become commonplace for users to photograph, that is, obtain image data, wherever they may be, as long as they have their portable phones. However, as the sizes of the portable phones are limited, the memory capacity for storing image data therein is also limited. In order to store the large amount of image data obtained during a trip, for example, it is necessary to utilize a storage system such as that described above.

However, with regard to the image storage system as described above, in the case that a user is to utilize the data management service, user registration is necessary. The user registration of these systems involve the name, address, and phone number of the user in addition to the user name and password, and is troublesome to complete.

In addition, with regard to the image storage system as described above, it is often the case that there is only once storage server, which acts as the storage apparatus. Oftentimes, users who employ portable phones with built-in cameras upload all of the image data obtained by photography while on a trip. However, not all of the image data necessarily requires permanent storage. Due to the capacity of the server, there is usually an upper limit to the memory capacity assigned to each user. Unless the user organizes uploaded image data immediately, new image data may not be uploaded. Alternatively, the user may have to pay a fee to store image data that need not be permanently stored.

Further, in the case that a portable phone is used for photography, the image data obtained thereby is generally uploaded to a storage server operated by the vendor of the portable phone and stored therein. It is simple for the portable phone vendor to construct a database simply for storing image data. However, it is difficult for such a vendor to construct a storage server that provides other editing and organizing functions, or service functions such as offering promotions to users, as proposed in U.S. patent application Ser. No. 10/242,770 described above. Although the portable phone vendors are willing to provide the service of storing the image data of their users, there is a desire to delegate the other services to another vendor.

However, it is very inconvenient for the user to utilize a service on image data that he has already uploaded. This would involve accessing the server that provides the desired service, then uploading the image data again, to this server.

The image storage system as proposed in aforementioned U.S. patent application Ser. No. 10/242,770 provides the conveniences of allowing users to organize image data and ordering prints. However, the storage server becomes extremely large, and of a complex structure. The properties of image management services for storing and organizing image data and image printing systems for performing printing related processes (e.g., reception of printing conditions, the processing for causing a printing apparatus to print out the prints, etc.) are disparate in their nature, and the respective apparatuses (e.g., a server for performing image management processes and the like and a server for performing printing related processes) for carrying out the respective process are of different configurations. Further, in order to configure these apparatuses of different configurations, different know-how is required for each of the respective apparatuses, whereby it becomes difficult for a single vendor to configure a complete system providing both the image data management and image printing systems. Therefore, a demand has developed for image data management servers for storing image data to be configured by a vendor having expertise in databases and image printing servers for performing printing related processes to be configured by another vendor, who has expertise in printing systems.

However, if an image management service that is divided into an image data management server for storing and organizing image data and an image printing server for performing printing related processes, wherein a vendor proficient in storage technology operates the image data management server and another vendor proficient in printing technology operates the image printing server is provided, because the user has to access both the image storing server and the image printing server to send from the image data managing server to the image printing server the image data desired to be printed when image data stored in the image data management server is to be printed out by the image printing server, and to issue the command to print at the image printing server, the burden on the user is troublesome.

SUMMARY OF THE INVENTION

The present invention has been developed in consideration of the foregoing circumstances, and it is an object of the present invention to provide an image management service that offers ease of operability to both the user and the party constructing the servers to be employed in the service.

The image management system according to the present invention comprises:

an access receiving means for receiving accesses from a portable terminal apparatus having a transmitting party code and which is capable of obtaining the transmitting party code of the portable terminal apparatus, an image ID issuing means for attaching a unique image ID to image data that has been received thereby from the portable terminal apparatus through the access receiving means, and a first storage means for storing, the image data with the image ID attached thereto, for each transmitting party code.

Here, "a portable terminal apparatus having a transmitting party code" refers to a portable terminal apparatus that has a unique transmitting party code, and that includes its transmitting party code along with the data to be transmitted when sending a transmission. A cellular telephone capable of indicating its own phone number when transmitting is one example of such a portable terminal apparatus; wherein, "indicating its phone number" means that when the cellular phone is used to place a call or to transmit data packets or the like, the cellular phone is capable of indicating its own phone number (transmitting party code) to the party receiving a call from the cellular phone or the terminal receiving the data packet transmission.

That is to say, the image management system of the present invention makes use of the uniqueness of the transmitting party code of a cellular phone or a portable terminal apparatus. When an access is received from a cellular phone, the phone number of the accessing cellular phone is read out and used as data that specifies the user; whereby an image management service can be provided to the user and the user registration process simplified.

The referents of "image data" include image data that represents still images, as well as image data that represents moving images.

Further, the image data can be image data obtained by use of a camera with which the cellular phone is equipped, or image data obtained as a file attachment to an e-mail received by a data packet transmission.

It is preferable that the image management system of the present invention be provided with a second storage means in addition to the first storage means for storing image data from among the image data stored in the first storage means fulfilling predetermined conditions.

Here, the referents of "image data from among the image data stored in the first storage means fulfilling predetermined conditions" can be various types of conditions depending on the purpose of the system; e.g., the size of the image data, the image data for which the storage period exceeds a predetermined system upper limit, image data that has been uploaded when the image data storage amount assigned by the user (for the present invention, the operator of the portable terminal apparatus having the transmitting party code) has become full, image data specified by the user, and the like. Further, the operation of moving image data from the first storage means to the second storage means can be performed according to commands issued by the user, or can be performed automatically by the first storage means.

Further, although the first and second storage means can be means made accessible to the user via the same access point (e.g. two Web servers having two URL addresses as subdirectories under the same URL address) for cases in which the image management service to be provided differs, for example, when the service offered is a service wherein the first storage means performs only storage of the uploaded image data, and the second storage means performs editing, arranging, and printing related processes (therefore, a service fee system is often adopted wherein the service charge for the use of the first storage means is free or very inexpensive, and the charge for the use of the second storage means is higher than that for the first storage means), it is desirable that the two storage means be provided as separate units (in the case of Web servers, both are provided as mutually independent units having two different URLs). In this case, the first storage means can be made to send image data fulfilling predetermined conditions to the second storage means, the image ID and data indicating the storage location (in the case of a Web server, the URL address thereof) of the image data transferred from the first storage means to the second storage means can be sent, whereby the image data can be downloaded from the first storage means based on the data sent from the second storage means, etc.

Further, in this case, it is desirable that the second storage means can also be provided with a means for reading out the transmitting party code of the accessing mobile electronic terminal apparatus so as to simplify the user registration process in the second storage means.

It is preferable that the second storage means according to the present invention comprises:

a selecting means for selecting, through a mobile electronic terminal apparatus having a transmitting party code which has access rights to image data stored in said second storage means, the desired image data from among the image data stored in said second storage means, a command receiving means for receiving through the mobile electronic terminal apparatus a print command for the selected image data, and a service implementing means for sending, when the command receiving means has received the print command, the data indicating the storage location of the image data and the image ID of said image data to a image printing server capable of downloading the image data from the storage location of said image data and performing the printing related processes while connecting the image printing server to the mobile electronic terminal apparatus, and causing the printing related processes to be performed by the image printing server.

Here, the referents of "print command" include any representation expressing the will of the user to print a desired selection; more specifically for example, the depressing of the "print" button provided by the command receiving means, or the clicking on the "print" tab in a menu bar.

Further, the referents of "printing related processes" include the reception of the printing conditions settings, the performance of the processes causing the printing apparatus to print out the desired images, and the like.

If the mobile electronic terminal apparatus, which is the user terminal of the image management system according to the present invention, is a mobile electronic terminal apparatus teat sends data representing its model type when accessing the system, it is preferable that the second storage means comprises:

a data base representing the image display capabilities of each type of mobile electronic terminal apparatus, a decoding means for decoding the data representing the model type of the accessing mobile electronic terminal apparatus to obtain the image display capability of said mobile electronic terminal apparatus, a selecting means for selecting, through a mobile electronic terminal apparatus having a transmitting party code which has access rights to image data stored in said second storage means, the desired image data from among said stored image data, a command receiving means for receiving through the mobile electronic terminal apparatus a command for displaying the selected image data, and a display means for converting, when a display command is received at the command receiving means, the format of the selected image data to a format matching the image display capabilities of the mobile electronic terminal apparatus and then displaying the image data.

It is preferable that the first storage means of the present invention comprises:

a selecting means for selecting, through a mobile electronic terminal apparatus having a transmitting party code which has access rights to image data stored in said first storage means, the desired image data from among the image data stored in said second storage means, a command receiving means for receiving through the mobile electronic terminal apparatus a print command for the selected image data, and a service implementing means for sending, when the command receiving means has received the print command, the data indicating the storage location of the image data and the image ID of said image data to a image printing server capable of downloading the image data from the storage location of said image data and performing the printing related processes while connecting the image printing server to the mobile electronic terminal apparatus, and causing the printing related processes to be performed within the image printing server.

If the mobile electronic terminal apparatus, which is the user terminal of the image management system according to the present invention, is a mobile electronic terminal apparatus that sends data representing its model type when accessing the system, it is preferable that the first storage means comprise:

a data base representing the image display capabilities of each type of mobile electronic terminal apparatus, a decoding means for decoding the data representing the model type of the accessing mobile electronic terminal apparatus to obtain the image display capability of said mobile electronic terminal apparatus, a selecting means for selecting, through a mobile electronic terminal apparatus having a transmitting party code which has access rights to image data stored in said first storage means, the desired image data from among said stored image data, a command receiving means for receiving through the mobile electronic terminal apparatus a command for displaying the selected image data, and a display means for converting, when a display command is received at the command receiving means, the format of the selected image data to a format matching the image display capabilities of the mobile electronic terminal apparatus and then displaying the image data.

The image management system according to the present invention decodes the transmitting party code of an accessing mobile electronic terminal apparatus, and uses the uniqueness of this transmitting party code to simplify the user registration process by using the transmitting party code as the user name.

Further, according to the image management system of the present invention, by providing a first storage means and a second storage means as separate units, it becomes possible for the respective storage means to be operated by service providers having expertise in different fields. For example, in the case of cellular phone companies, because the companies already have the customer data of its users, it is possible for any cellular phone company to easily provide a free image data storage service to its customers by obtaining the customer data based on the phone number of the cellular phone. However, because the task of constructing a system to provide editing, arranging, printing services and the like for the image data is difficult for a cellular phone company, if the image data specified by users who wish to use these services is transferred to a storage means (the second storage means) constructed by a specialist in another field, it becomes possible to provide users with other services while the cellular phone company can easily construct the first storage means. Further, because it is possible to configure the second storage means so as to provide the services offered thereby to the storage means (first storage means) of a plurality of cellular phone companies, the services can be specialized.

Still further, because the transferring of the image data is performed between the first storage means and the second storage means, the service is convenient from the user's standpoint in that the user does not have to expend the time and effort to upload image data to the second storage means.

For cases in which an image printing service is provided, because upon reception of a print command for an image data specified by the user through their portable terminal apparatus, the service implementing means of the first storage means or the second storage means according to the present invention sends the image ID and the data indicating the storage location of the image data to an image printing server, connects the user terminal and the image printing server, and causes the printing related processes to be performed in the image printing server, the image managing server and the image printing server can be constructed as separate, independent units. Therefore, from the standpoint of the service providers, it is advantageously only necessary to construct a server within one's field of expertise, and the user can advantageously receive both an image managing service and an image printing service without even being aware that two servers are being accessed.

According to the first or second storage means of the present invention, by providing a format converting display means, for cases in which image data being managed therein is to be displayed to the user, that converts the format of the image data to match the display capabilities of the mobile electronic terminal, even for cases in which the display capabilities of the mobile electronic terminal that uploaded the image data and the mobile electronic terminal apparatus on which the image data is to be viewed have different display capabilities, the image data can be provided in the optimal format to the mobile electronic terminal apparatus on which the image data is to be viewed.

BRIEF DESCRIPTION OF THE DRAWINGS

FIG. 1 is a block diagram of an embodiment of an image service system implementing the image managing system according to the present invention.

DESCRIPTION OF THE PREFERRED EMBODIMENTS

Hereinafter the preferred embodiments of the present invention will be explained with reference to the attached drawings.

Figure 2A:
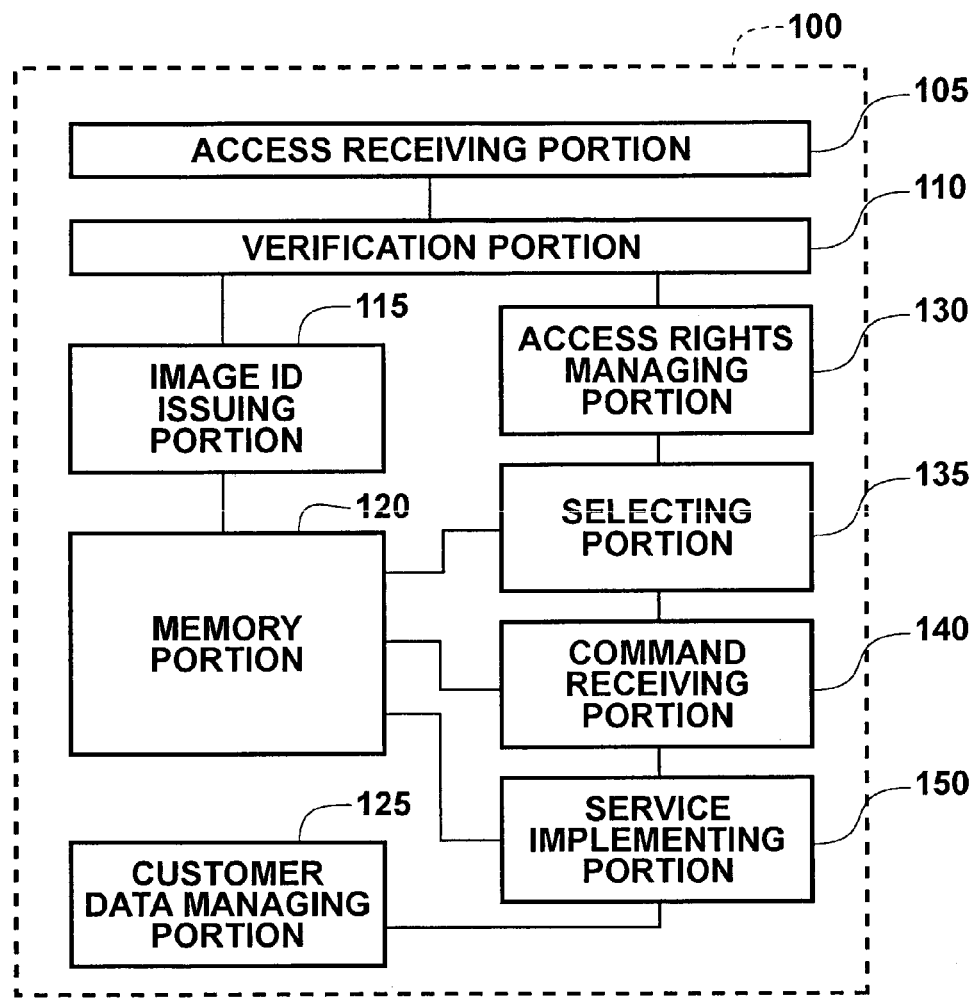
FIGS. 2A and 2B are block drawings of the first server 100 of the image service system shown in FIG. 1, FIGS. 3A and 3B are block drawings of the second image server 200 of the image service system shown in FIG. 1.
Figure 2B:
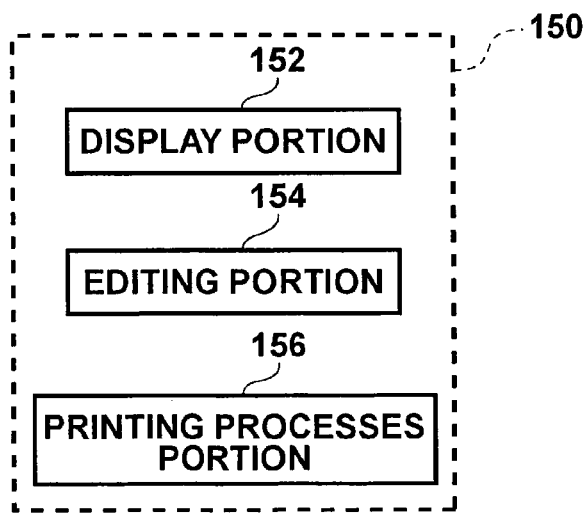
Figure 3A:
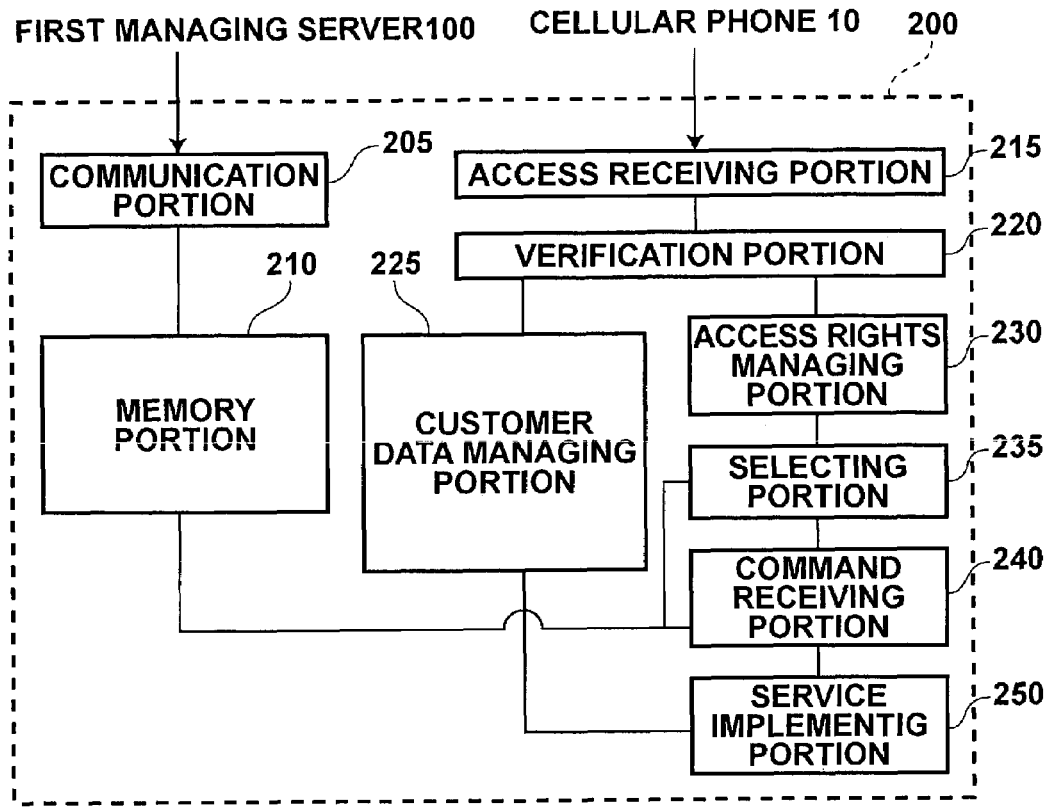
Figure 3B:
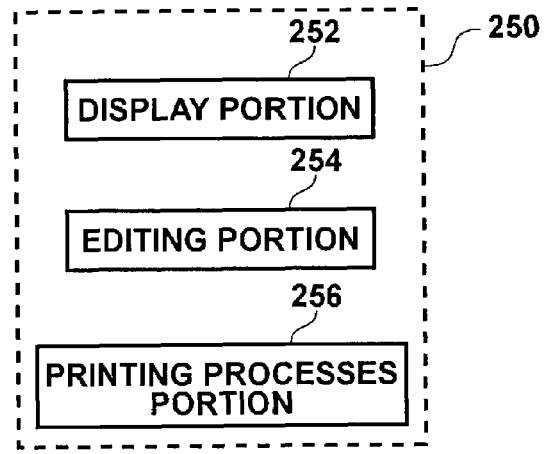
Figure 4:
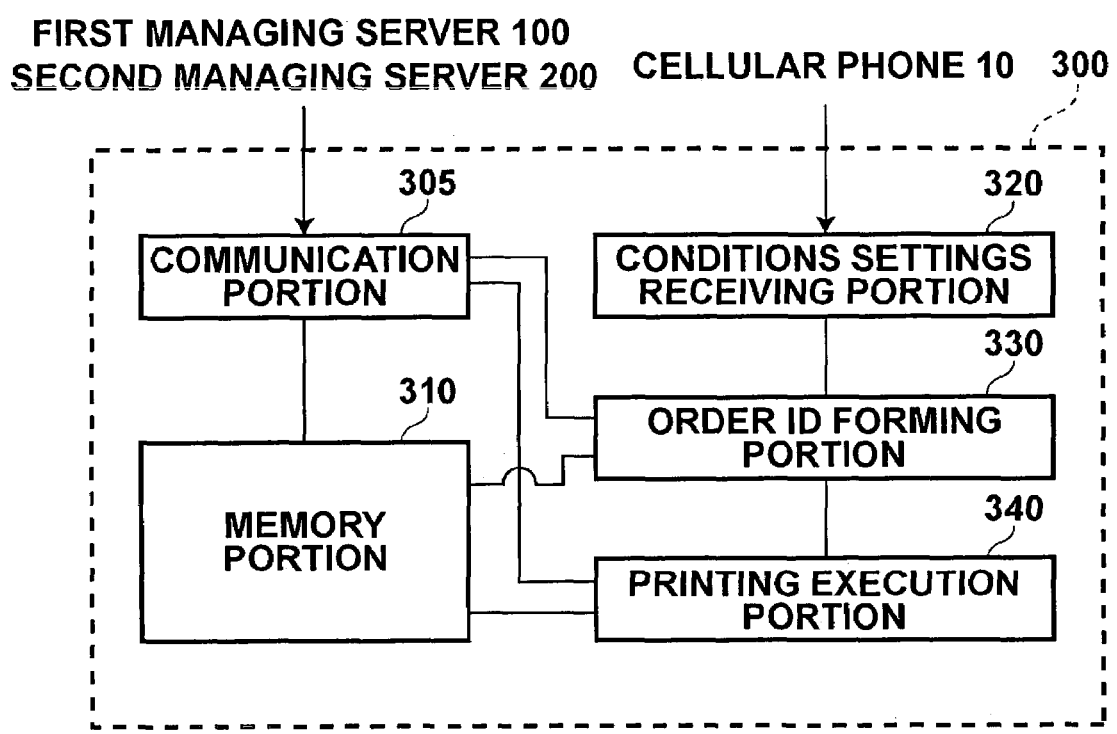
FIG. 4 is a block drawing the image printing server 300 of the image service system shown in FIG. 1.

FIG. 1 is a block diagram of an embodiment of an image service system implementing the image managing system according to the present invention. FIGS. 2A and 2B are block drawings of the first managing server 100 of the image service system shown in FIG. 1. FIGS. 3A and 3B are block drawings of the second managing server 200 of the image service system shown in FIG. 1, and FIG. 4 is a block drawing the printing server 300 of the image service system shown in FIG. 1.

As shown in FIG. 1, the image service system of the current embodiment comprises: a first managing server 100 for storing and managing image data that has been transmitted thereto over an internet 30 by a user utilizing a cellular phone 10; a second managing server 200 for managing image data specified from among the image data being stored in the first managing server 100 by the user to be stored permanently; and a image printing server 300 for receiving, when the user issues a command through the cellular phone 10 to print a selected image data stored in the first managing server 100 or the second managing server 200, from the first managing server 100 or the second managing server 200 data (a URL) indicating the storage location of said image data, and connecting through the first managing server 100 or the second managing server 200 to the cellular phone 10 and performing printing related processes (receiving the printing conditions from the user terminal described below, and sending the downloaded image data and the received printing conditions to a printing apparatus); wherein, when the image printing server 300 receives from the first managing server 100 or the second managing server 200 the URL of the selected image data and is connected to the cellular phone 10, the various printing conditions that apply in printing said image data, e.g. the settings for the print reception scheme (postal delivery, over-the-counter reception, etc.), the store at which the print is to be received in the case of over-the-counter reception, the print size, the number of prints, and the like are set by the user through the cellular phone 10, the image data is downloaded from the received URL, the image data and the printing conditions that have been set for said image data are sent to the printing apparatus 20 of the receiving mini photo lab store, from among each of the mini lab photo stores printing apparatuses 20 which perform the actual printing out of the image data, and causes the printing out to be performed.

According to the current embodiment, although a web page is utilized as the user interface between the first managing server 100, the second managing server 200 and the user terminal, that is, the cellular phone 10, for the sake of simplicity, the details of the screen structure of the web page will not be particularly described below.

FIG. 2A is a schematic drawing of the first managing server 100. As shown in FIG. 2A, the first managing server 100 comprises: an access receiving means 105 for receiving an access from the cellular phone 10 and reading out the telephone number and model type data of the accessing cellular phone 10; a registration verification means 110 for recording a user password the first time the phone number of said cellular phone 10 accesses the first managing server 100 and for prompting the user, in the case that the phone number of said cellular phone 10 has already been registered, to input the password so as to verify the user registration; an image ID issuing portion 115 for issuing, when the first managing server 100 has been accessed by the cellular phone 10 in order to upload image data, a unique image ID to the image data that has been sent thereto; a memory portion 120 for attaching the image ID to the image data and storing said image data in the area that has been assigned to the phone number of the cellular phone 10; an access rights managing portion 130 for confirming, when the access request from the cellular phone 10 is for image data that has already been stored in the memory portion 120, whether or not the phone number of said cellular phone 10 has access rights to the stored image data, and denying access to a cellular phone 10 that does not have access rights to said stored image data; a selecting portion 135 for displaying, when the accessing cellular phone 10 is authorized access to the stored image data, the image data said cellular phone 10 has access rights to as thumbnail images so that the user can select the desired image data therefrom; a command receiving portion 140 for providing on the screen of the cellular phone 10 the service menu for the selected image data, so that the user can specify a desired service, and receiving the service command given for said specified service; a service implementing portion 150 for performing the service according to the received service command received by the command receiving portion 140; and a customer data managing portion 125 for managing the name, address and the like of each cellular phone owner according to the phone number of the respective cellular phone.

The first managing server 100 of the current embodiment is operated by the cellular phone company of the cellular phone that uploads image data, and it is possible to obtain, based on the phone number of the cellular phone 10, the customer data of the user of said cellular phone 10 from the customer data managing portion 125.

It is a matter of course that the access rights managing portion 130 recognizes the access rights of a cellular phone having the same phone number as that of a cellular phone that has uploaded image data stored in the respective area of the memory portion 120 assigned to each phone number. Further, the access rights managing portion 130 also recognizes the access rights of cellular phones to which access rights have been granted by the cellular phone having that phone number. Note that the access rights managing portion 130 is provided with an access rights setting portion (not shown), which is capable of authorizing the access rights of a phone number. More specifically, if the access rights setting portion registers, utilizing the cellular phone used when image data has been uploaded or a cellular phone having the same phone number as said cellular phone (hereinafter referred to as an image data owner's phone: e.g., a cellular phone to which a subscriber has upgraded and transferred their same phone number) said phone number as having authorization to access image data being stored in the area which has been assigned to said phone number, the access rights managing portion 130 authorizes access by the cellular phone having the phone number that has been registered. In this manner, if an owner of image data sends the address (URL) of the first managing server 100 managing their image data to a friend or the like, the owner of the image data can show the photographic images they have taken and share them with friends. However, although the access rights managing portion 130 grants all access rights (described below: the rights to issue commands to "display", "edit", "print") to the cellular phone of the owner of the image data, the access rights managing portion 130 grants only the right to peruse ("display") image data to a cellular phone that has another registered phone number.

The image ID issuing portion 115 attaches a unique image ID to each image data that has been uploaded from a cellular phone 10. Note that according to the current embodiment, the image ID is an ID associated with the phone number of the cellular phone 10.

The command receiving portion 140 for receiving service commands applying to the image data selected by the selecting portion 135 receives one of the service commands, which are "display", "edit", "print", from a user having access rights corresponding to the service command, and the service implementing portion 150 executes the command for the service specified by the user. FIG. 2B is a block diagram showing the configuration of the service implementing portion 150 shown in FIG. 2A. As shown in FIG. 2B, the service implementing portion 150 comprises: a display portion 152 for displaying, when the user has selected an image to be displayed from among the thumbnail images displayed by the selecting portion 135 and issued the display command (e.g., when the user selects desired image data from the thumbnail images and clicks on the "display" button on the service menu, when the user double clicks on the thumbnail image of desired image data, etc.), the selected image data; an editing portion 154 for performing editing specified by the user on the selected image data when the editing command has been issued for said image data; and a printing processes portion 156 for performing printing processes when the print command has been issued for the selected image data. Here, the operations of the display portion 152, the editing portion 154 and the printing processes portion 156 will be explained more specifically.

The display portion 152 is a display portion for displaying the image data selected by a cellular phone 10 having access rights; however, the display portion 152 is provided with a data base (not shown) related to the display capabilities (e.g. black and white or color, number of pixels, number of colors, screen size, and the like) for each type of cellular phone. The display portion 152 determines, based on the cellular phone model type data received for the cellular phone 10 from the access means 105, the data base for the display capabilities of the cellular phone requesting access, converts the image data to a format-matching the display capabilities of the cellular phone 10, and displays the image. In a case, for example, in which the selected image data represents a color image, but the cellular phone requesting access can only display black and white images, the display portion 152 converts said color image data to monochrome image data (binary values) and displays the image. When the number of pixels of the selected image data is less than that of the display capabilities of the cellular phone requesting access, for example, said image data can be subjected to an interpolation process or the like and the image displayed. Note that if the selected image data is monochrome image data but the accessing cellular phone has a color display, because color data cannot be obtained from the image data, format conversion is not performed. In this manner, even when an owner of image data who has upgraded to a different model cellular phone requests access, or grants access to their image data to a friend who has a different type of cellular phone, it is possible for the image data to be displayed in a formatting matching that of the accessing cellular phone.

The editing portion 154 provides editing services for editing target image data stored in the storage portion 120. Note that the according to the current embodiment, the editing portion 154 can perform the standard editing processes specified by the user through the cellular phone 10, such as deleting image data, changing the order of the image data, creating a photo album, and the like, as well as the additional editing process of "permanent save". More specifically, when the "Permanent save" command specified from the "Edit" menu is received at the command receiving portion 140 for image data selected at the selecting means 135, the editing portion 154 sends the data indicating the storage location (the URL of the first managing server 100) of the selected image data and the image ID of the selected image data to the second managing server 200, and sends to the user through the cellular phone 10 data indicating the location of the second managing server 200 (the URL of the second managing server) that is to perform the permanent saving service.

The printing processes portion 156 operates when a print command for the selected image data has been received by the command receiving portion. When a print command for the selected image data has been received by the command receiving portion 140, the printing processes portion 156 sends the data indicating the storage location (the URL of the first managing server 100) and the image ID of the selected image data to the image printing server 300, connects the accessing cellular phone 10 and the image printing server 300, and causes the printing related processes to be performed in the image printing server 300.

The printing processes portion 156 forms the destination address data of the print that has been printed out, and sends said destination address data along with the image ID of the selected image data to the image printing server 300; the printing processes portion 156 is provided with a destination address managing portion (not shown) which is described below.

FIG. 3A is a schematic drawing of the configuration of the second managing server 200. As shown in FIG. 3A, the second managing server 200 comprises: a communications portion 205 for downloading, based on the URL and the image ID of the selected image data which have been received from the first managing server 100, the selected image data, and for decoding the phone number of the cellular phone, which is included in the image ID, of the owner of the image data; a memory portion 210 for attaching an image ID to the image data downloaded by the communications portion 205 and storing the downloaded image data according to the phone number of the cellular phone of each image data owner; an access receiving portion 215 for receiving access from the cellular phone 10 and reading out the phone number and the model type data of the cellular phone from the accessing cellular phone 10; a verification portion 220 for recording, in the case that it is the first time a request for access has been received from said phone number of the cellular phone 10, the customer data such as the name, address and the like, as well as a password, and for prompting, in the case that the customer data and password of the phone number of the accessing cellular phone 10 has already been registered, the user to input their password and verifying the user registration; a customer data managing portion 225 for storing the customer data registered at the verification portion 220 for the phone number of each registered cellular phone 10; an access managing portion 230 for verifying whether or not the phone number of a cellular phone 10 requesting access has access rights to the image data being stored in the memory portion 210, and refusing access to the cellular phone 10 if the cellular phone 10 does not have access rights to said image data; a selecting portion 235 for displaying, for a cellular phone 10 having access rights, the image data to which said cellular phone 10 has access rights as thumbnail images so that the user can select desired image data; a command receiving portion 240 for providing a service command menu for the selected image data so that the user can give a command for a desired service; and a service implementing portion 250 for executing the service according to the service command issued by the command receiving portion 240.

The second managing server 200 according to the current embodiment is a server for managing image data from among the image data that the user has uploaded to the first managing server 100 and wishes to have stored permanently. Because it is presumed that the second managing server 200 is operated by a company other than the cellular phone company, although the phone number of an accessing cellular phone 10 can be read out, in order to protect customer privacy the customer data such as name, address and the like cannot be obtained from the first managing server 100. Therefore, the customer data of a user having a cellular phone 10 that has accessed the second managing server 200 is obtained by the user registration process performed in the verification portion 220.

It is a matter of course that the access rights managing portion 230 recognizes the access rights of a cellular phone having the same phone number as that of a cellular phone that has uploaded image data stored in the respective area of the memory portion 210 assigned to each phone number. Further, the access rights managing portion 230 also recognizes the access rights of cellular phones to which access rights have been granted by the cellular phone having that phone number. Note that the access rights managing portion 230 is provided with an access rights setting portion (not shown); the access rights setting portion can set the authorization for a phone number to have access rights. More specifically, if a phone number is registered at the access rights setting portion, utilizing the cellular phone having the phone number of the image data owner's phone, as having authorization to access image data being stored in the area which has been assigned to the phone number of the owner of said image data, the access rights managing portion 230 authorizes access by the cellular phone having the phone number that has been registered. In this manner, an owner of image data can send the address (URL) of the second managing server 200 which manages their image data to a friend or the like to show and share the photographic images they have taken. However, although the access rights managing portion 230 grants all access rights (described below: the rights to issue commands to "display", "edit", "print") only to the cellular phone of the owner of the image data, the access rights managing portion 230 grants only the access right to peruse ("display") image data to another cellular phone having a registered phone number.

The command receiving portion 235 for receiving a service command applying to the image data selected by the selecting portion 135 receives one of the service commands, which are "display", "edit", "print", from a user having access rights corresponding to the service command, and the service implementing portion 250 executes the command for the service specified by the user. FIG. 3B is a block diagram showing the configuration of the service implementing portion 250 shown in FIG. 3A. As shown in FIG. 3B, the service implementing portion 250 of the second managing server 200 comprises, the same as the service implementing portion 150 of the first managing server 100: a display portion 252 for displaying, when the user has selected an image to be displayed from among the thumbnail images displayed by the selecting portion 235 and given the display command (e.g., when the user selects a desired image data from the thumbnail images and clicks on the "display" button on the service menu, when the user double clicks on the thumbnail image of a desired image data, etc.), the selected image data; an editing portion 254 for performing editing specified by the user on the selected image data when an editing command has been given for said image data; and a printing processes portion 256 for performing printing processes when the print command has been issued for the selected image data. Here, because the operations of the display portion 252 of the second managing server 200 are the same as those of the display portion 152 of the first managing server 100, further explanation thereof is omitted. Note that the editing portion 254 of the second managing server 200 provides editing services for editing target image data stored in the storage portion 120; however, these editing services consist of standard editing processes specified by the user through the cellular phone 10, such as deleting image data, changing the order of the image data, creating a photo album, and the like, and do not include the "permanent save" editing service offered by the editing portion 154 of the first managing server 100.

The printing processes portion 256 operates when a print command for the selected image data has been received by the command receiving portion. When a print command for the selected image data has been received by the command receiving portion 240, the printing processes portion 256 sends the data indicating the storage location (the URL of the second managing server 200) of the selected image data and the image ID of the selected image data to the image printing server 300, connects the accessing cellular phone 10 and the image printing server 300, and causes the printing related processes to be performed in the image printing server 300. The printing processes portion 256, in the same manner as occurs in the first managing server 100, forms the destination address data of the print that has been printed out, and sends said destination address data and the image ID of the selected image data to the image printing server 300; the printing processes portion 256 is provided with a destination address managing portion (not shown) which is described below.

FIG. 4 is a block diagram of the configuration of the image printing server 300 according to the present embodiment. The image printing server 300 receives, when a print command issued by the user through the cellular phone 10 for a selected image data has been received at the first managing server 100 or the second managing server 200, the URL of the image data selected from the first managing server 100 or the second managing server 200 (the data indicating the storage location of the selected image data) and the image ID, and is connected to said cellular phone 10. As shown in FIG. 4, the image printing server 300 comprises a communication portion 305 for communicating with the first managing server 100 or the second managing server 200; a memory portion 310 for recording and storing image data obtained from the first managing server 100 or the second managing server 200; a conditions receiving portion 320 for receiving, when connected to the cellular phone 10, the printing conditions that have been set by the user through the cellular phone 10; an order ID forming portion 330 for receiving the printing conditions, forming an order ID associated with the image ID when the print request has been confirmed and providing the order ID to the user through the cellular phone 10, and also sending, for cases in which a print delivery method of "postal delivery" has been selected at the command receiving portion 320, the order ID to the printing processes portion (the printing processes portion 156 or 256) of the target managing server; and a printing execution portion 340 for sending the destination address data for said order ID, which has been sent through the communication portion 305 of the destination address managing portion of the printing processes portion 156 or 256, as well as the image data to be printed out, the printing conditions, and the image ID of the image data to the printing apparatus 20 of the target mini photo lab and causing the image data to be printed out. Note that the referents of "target mini photo lab" include for example: when the user has set through the conditions settings receiving portion 320 "pickup at store" as the delivery method, the specified mini photo lab; when "postal delivery" has been set as the delivery method, the mini photo lab geographically nearest the destination address that has been sent through the printing processes portion 156 or 256, as determined based on said destination address.

Note that each printing apparatus 20 receiving the image data from the printing server 300 prints out the image data according to the printing conditions the printing conditions, such as the number of prints, size, type of printing paper and the like that have been set for said image data, and in the case that postal delivery has been specified as the delivery method, mails the print to the destination address indicated by the destination address data corresponding to each order ID; however, in the case that the store pickup has been specified, the print is stocked so that the user can visit the store to pick up the print.

Here, the operation of the printing processes portions 156 and 256, which are tasked with forming the destination address, will be explained. When the destination address forming portion (not shown) of the printing processes portions 156 and 256 receive the order ID from the image printing server 300, the destination address forming portion decodes the phone number of the cellular phone 10 of the user requesting the print from the image ID data included in said order ID, then reads out the customer data of the user owning said cellular phone from the respective customer data receiving portion 125 or 225, forms, based on the read out customer data, the destination address data of the print, associates said destination address data with the order ID, and sends said order ID and the associated destination address data to the image printing server 300.

Generally, in order to protect the privacy of the user, the first managing server 100 and the second managing server 200 are not authorized to provide the customer data of a user requesting a print to the image printing server 300 operated by another company. According to the current embodiment, by providing each of the respective printing processes portions (156 and 256) of the first managing server 100 and the second managing server 200 with a destination address managing portion, a destination address corresponding to the order ID is formed and sent to the image printing server 300; whereby, the user's privacy can be protected and the print printed out at a mini photo lab or the like can be delivered with no problems.

Note that the communication portion 305 of the image printing server 300 receives the URL of the image data and the image ID from the first managing server 100 or the second managing server 200, accesses the received URL and downloads the target image data, sends the order ID formed by the order ID forming portion 330 and the image ID of the image data that is the object of said print order to the respective printing processes portion of the target managing server (the printing processes portion 156 of the first managing server 100 or the printing processes portion 256 of the second managing server 200), receives the destination address data returned from the printing processes portion 156 or 256, and provides said destination address data to the printing execution portion 340.

Heretofore, the configuration of the image service system according to the current embodiment and the operation of the components thereof have been explained. Hereinafter, with reference to FIGS. 5, 6 and 7, the operation of the current embodiment will be explained in more detail.

Figure 5:
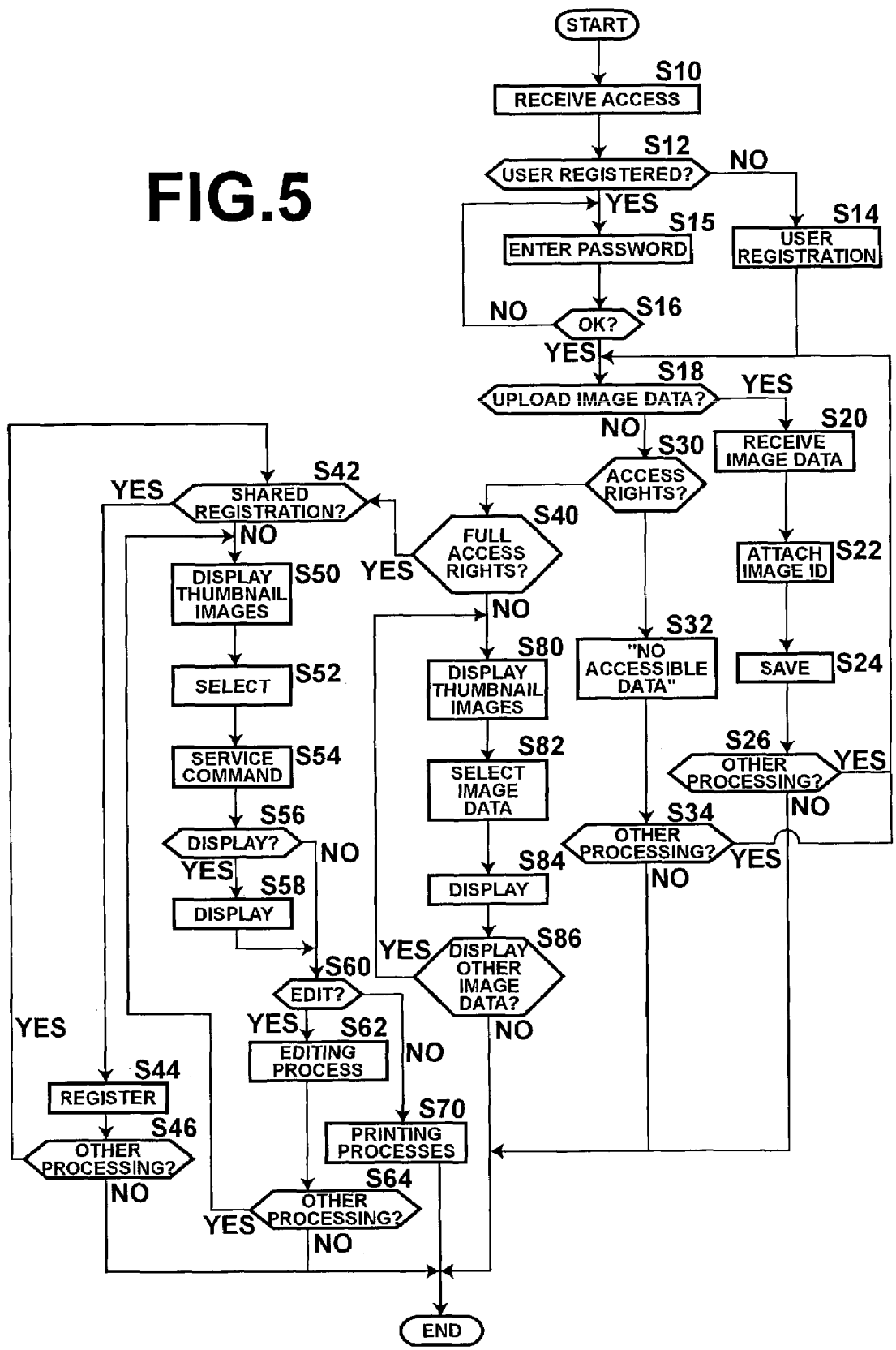
FIG. 5 is a flowchart of the operation of the first managing server 100.

FIG. 5 is a flowchart of the operation of the first managing server 100 shown in FIG. 1. As shown in FIG. 5, when the first managing server 100 receives at the access receiving portion 105 a request for access from a cellular phone 10 over an internet 30, the access receiving portion 105 reads out the phone number and model type of said cellular phone 10, and the verification portion 110 checks whether or not the user registration for the cellular phone 10 having said phone number has been completed (steps S10, S12). If the user is not registered, the user is prompted to register a password and complete the registration process (step S12: No. S14); however, if the request for access is from a cellular phone having a phone number for which the user registration has already been completed, the user is prompted to enter their password, and user authentication is performed (steps S15, S16). Because the first managing server 100 can obtain the customer data and the like of the user from the phone number, the user registration process of the first managing server 100 consists of the password registration process.

If the correct password is entered (step S16: Yes), or user registration is carried out (S14), and the request for access from the user is to upload image data (S18: Yes), the first managing server 100 receives the transmitted image data and the image ID issuing portion 115 attaches a unique image ID to each image data received thereby (steps S20, S22). Note that the image ID is an ID that includes data representing the phone number of the cellular phone 10 that has transmitted the image data. The image data to which an image ID has been attached is stored within the area assigned by the memory portion 120 to the phone number of the cellular phone 10 (step S24). If no other processes are to be performed (step S26: No), the first managing server 100 performs logout processing for the cellular phone 10, and the processing is complete; however, if there are other processes to be performed (step S26: Yes), the processing returns to S18.

On the other hand, in step S18, for cases in which the request for access from the cellular phone 10 is for accessing image data stored in the memory portion 120 (S18: No), the access rights managing portion 130 checks the access rights of said cellular phone 10 (S30). If the phone number of the cellular phone 10 is neither the phone number of the cellular phone of the owner of any of the image data stored by the memory portion 120 in accordance with each respective registered phone number, nor a phone number that has been registered to have a viewing access right (S30: No), the access rights managing portion 130 sends a message reading "no accessible data" (S34: 32); if said cellular phone has other processes to be performed (in this case, the only possible process is the uploading of image data) (S34: Yes), the processing returns to S18, if there are no other processes to be performed (S34: No), the logout process is performed for the cellular phone 10 and the processing is complete.

In step S30, if the phone number of the cellular phone 10 requesting access is a phone number that has access rights to any of the image data stored in the memory portion 120 (step S30: Yes), the access rights managing portion 130 further checks the type of access rights of the cellular phone 10 (S40). If the cellular phone 10 is the cellular phone of an owner of any of the data stored in the memory portion 120, a determination is made that said cellular phone 10 has access rights to the corresponding image data (S40: Yes), the user is prompted to give a service command from among "shared registration" (registering another phone number as having authorization to view one's own image data) (S42: Yes, S44, S46), "display" and "edit" through said cellular phone 10. In providing the user access by means of the services commands to the offered services, first, the selecting portion 135 displays as thumbnail images the image data stored in the area of the memory portion 120 assigned to the phone number of the cellular phone 10 for the user to select from (S42: No, S50, S52). Then, the service implementing portion 150 performs on the selected image data the service of the service command from among "display", "edit", and "print" that is received by the command receiving portion (S54-S70). That is to say, if the "display" command is specified the selected image data is displayed (S56: Yes, S58), if the edit command is specified editing processes are performed on the selected image data (S56: No, S60: Yes, S62), and if there are no other processes to be performed (S64: No) the logout process is performed for the cellular phone 10; however, if the print command is specified (S60: No) the data indicating the storage location of the selected image data (the URL of the first managing server 100) and the image ID are sent to the image printing server 300, a connection is set up between the cellular phone 10 and the image printing server 300 and the printing processes are performed (S70), and the processing of the first managing server 100 is complete. Note that although not shown in the drawings, the printing processes of S70 include the processes of reading out, when the order ID is subsequently received from the image printing server 300, the phone number of the cellular phone of the owner of the image data that is the object of the print order from the image ID included within the order ID, forming a destination address data based on the read out phone number, correlating the destination address data and the order ID, and sending the order ID and associated destination address data to the image printing server 300.

Note that the editing processes occurring in S62, that is, the editing processes performed by the editing portion 154 of the first managing server 100, include the standard editing processes such as deleting image data, arranging the order of the image data, creating a photo album, and the like, in addition to featuring an editing process wherein the editing portion 154 sends the image ID of the selected image data as well as the URL of said image data to the second managing server 200, and sends to the user through the cellular phone 10 the URL address of the second managing server 200 in which the permanent saving of said image data is to be carried out.

On the other hand, in S40, if the cellular phone 10 is a cellular phone having a phone number which has been registered as a shared registration by the owner of an image data, the access rights managing portion 130 determines that the cellular phone 10 has a viewing access right to the target image data, (S40: No). The selecting means 135 displays as thumbnail images through the cellular phone 10 the image data the cellular phone 10 has a viewing access right to so that the user of the cellular phone 10 can select desired image data, and the selected image data is displayed on the cellular phone 10 by the display portion 152 of the service implementing portion 150 (S80, S82, S84). If there is other image data that the user of the cellular phone 10 wishes to view (S86: Yes), the steps S80 through S84 are repeated; however, if the user does not want to view other image data (S86: No), the logout process is performed for the cellular phone 10 and the processing is complete.

When the image ID and URL of an image data are received from the editing portion 154 of the first managing server 100, the communication portion 205 of the second managing server 200 accesses the first managing server 100, downloads the corresponding image data, and stores the image data in the storage memory portion 210 corresponding to each respective phone number. The second managing server 200 manages the image data from among the image data managed by the first managing server 100 that has been specified to be permanently saved by the owner of said image data; the operation of said server when said server receives a request for access from a cellular phone 10 is shown in the flow chart of FIG. 6.

Figure 6:
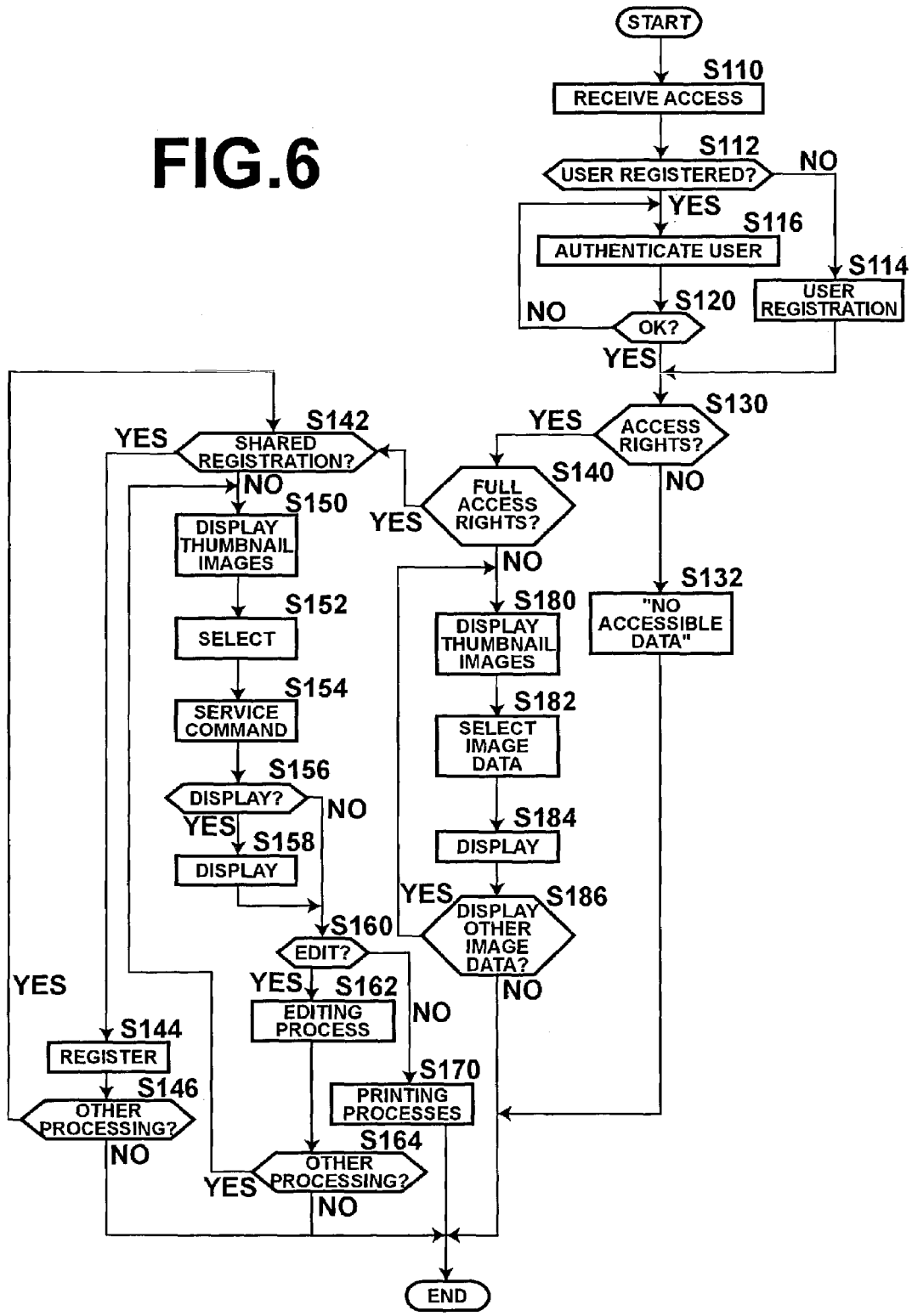
FIG. 6 is a flowchart of the operation of the second managing server 200.

As shown in FIG. 6, according to the second managing server 200, the access receiving portion 215 receives a request for access from a cellular phone 10 and reads out the phone number of the cellular phone 10 (S110), and the verification portion 220 verifies the access rights of the user (S112). If the accessing cellular phone 10 has a phone number for which the user registration has already been completed, the user is prompted to enter their password, and user authentication is performed (steps S112: Yes, S116). If the accessing cellular phone 10 has a phone number for which the user registration has yet to be completed (S112: No), the user is prompted to complete the registration process (S114). Note that the registration process of the second managing server 200 is different from that of the first managing server 100: aside from a password, the user's name, address and the like are registered, associated with the phone number of the cellular phone 10 and recorded in the customer data managing portion 225. If the correct password is entered from a cellular phone 10 having a registered phone number (step S120: Yes), or the user registration process has been completed by a new user (S114), the verification portion 230 of the second managing server 200 checks the access rights of the accessing cellular phone 10 (S130). Except for the editing processes, the process of checking the access rights and the subsequent shared registration process, service processes and the like are the same as those occurring in the first managing server 100; therefore, only the editing processes will be explained hereinafter. The editing processes performed by the editing portion 154 of the first managing server 100 include the standard editing processes (FIG. 5 step S62) such as deleting image data, changing the order of the image data, creating a photo album, and the like, as well as the additional editing process of "permanent save"; however, because the second managing server 200 stores only image data that has been specified to be permanently stored, the editing processing portion 254 thereof performs only the standard editing processes such as deleting image data, changing the order of the image data, arranging image data, creating a photo album, and the like, and does not perform the "permanent save" process.

Figure 7:
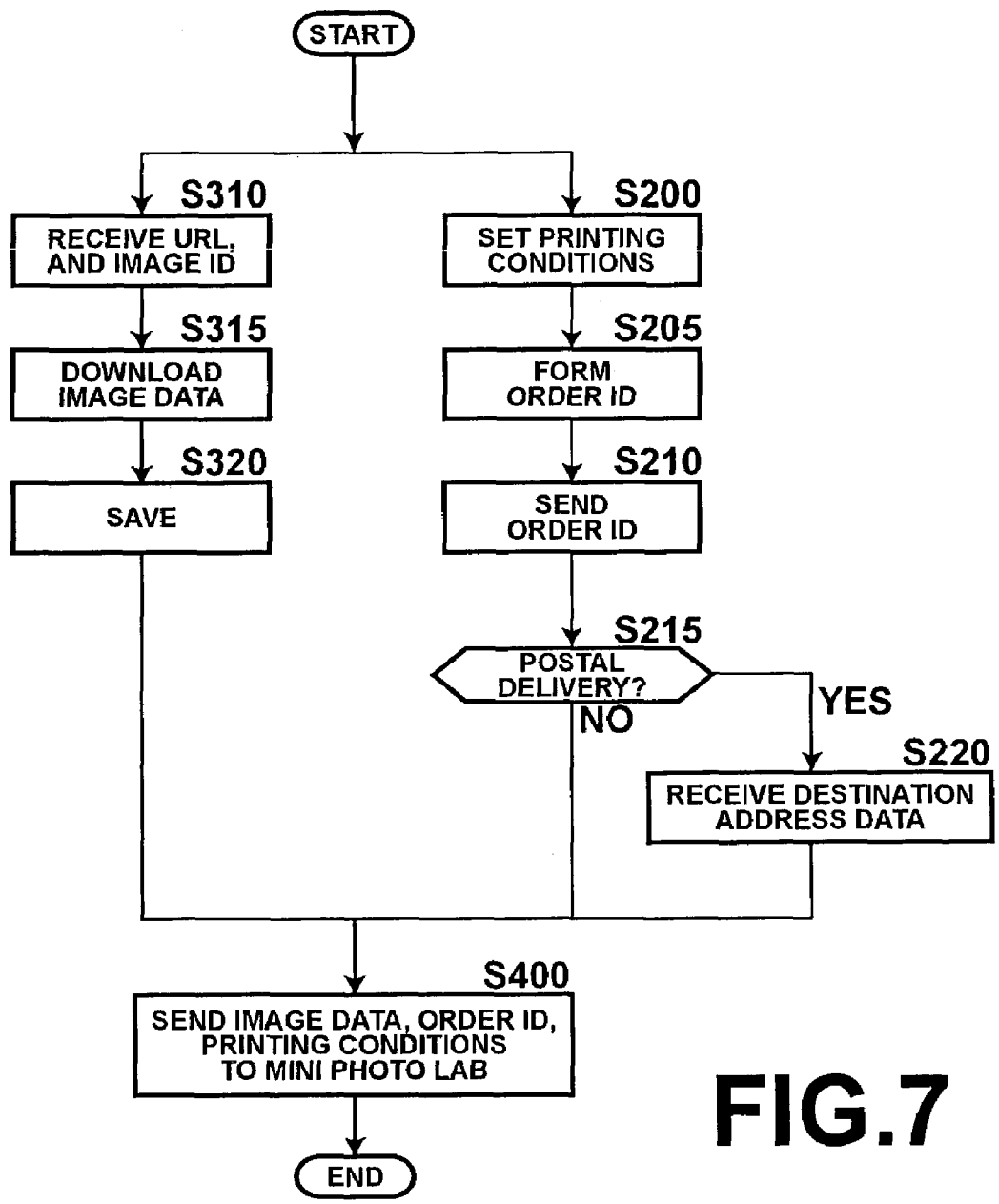
FIG. 7 is a flowchart of the operation of the image printing server 300.

FIG. 7 shows the operations occurring after the image printing server 300 has been connected by the printing processes portion 156 of the first managing server 100 or the printing processes portion 256 of the second managing server 200 to a cellular phone 10 that has given a print command. As shown in FIG. 7, because the image printing server 300 is connected to the cellular phone 10 and has received from the first managing server 100 or the second managing server 200 the URL and image ID of an image data for which a print command has been given, the user is prompted to set the printing conditions (the delivery method, the receiving store, print size, number of prints, type of printing paper, and the like) through the cellular phone 10 (S200). The order ID forming portion 330 forms a unique order ID for the image data corresponding to the received print order of which the printing conditions thereof have been set and confirmed and send the formed order ID to the connected cellular phone 10, and also sends, for a case in which "postal delivery" has been set as the delivery method, the order ID to the printing processes portion (the printing processes portion 156 of the first managing serve 100 or the printing processes portion 256 of the second managing server 200) of the managing server from which the URL of the corresponding image data has been received (S205, S210). For the case in which "pick up at store" has been specified as the delivery method, the printing execution portion 340 downloads, based on the URL address and the image ID of the image data that has been sent through the communication portion 305 from the target managing server and is the object of the print order, the image data that is the object of the print order and stores the downloaded image data in the memory portion 310 (S310, S15, S320), sends said downloaded image data, the printing conditions, and the order ID for carrying out the printing of the image data to the printing apparatus 20 of the specified mini photo lab that has been specified through the cellular phone 10, and causes the image data to be printed out (S215: No, S400). However, in the case that "postal delivery" has been specified as the delivery method, the printing execution portion 340 receives the print destination address data sent in response from the printing processes portion of the target managing server, sends said print destination address data, the order ID for the corresponding image data, and the printing conditions to the printing apparatus 20 of the mini photo lab geographically nearest the destination address and prints out the image data (S215: Yes, S220, S400). Here, the operation of the image printing server 300 is complete; however, the printing apparatus 20 receiving the image data and order ID, the printing conditions, and in the case of postal delivery the destination address data, prints out the image data according to the printing conditions to obtain the print. In the case of postal delivery, the mini photo lab at which the printing apparatus 20 is installed mails the print to the destination address indicated by the destination address data; however, in the case that the print is to be picked up at the store, the print is stocked so that the user can visit the store and pick up the print.

In this manner, according to the first managing server 100 or the second managing server 200 of the image service system of the current embodiment, because the phone number of an accessing cellular phone 10 is decoded and used as a user name for identifying the user, it becomes unnecessary for the user to register their user name, enter their name when requesting access, and the like, the service is advantageously convenient. In particular, because the customer data managing portion 125 of the first managing server 100 has both the phone number of the cellular phone and the customer data of the customer who owns said cellular phone, the service can be provided so that the user is not required to register their name and address.

Further, according the image service of the present embodiment, because the image management tasks have been divided and handled by a first managing server 100 and a second managing server 200, the first managing server 100 and the second managing server 200 can be run by different companies; whereby it becomes possible to specialize the services, and because the transferring of image data is performed between the first managing server and the second managing server, when image data that the user has once uploaded to the first managing server 100 and which is desired to be permanently saved is moved to the second managing server 200, it becomes conveniently unnecessary for the user to access the second managing server 200 using the cellular phone 10 to upload the image data.

Still further, when the first managing server 100 and the second managing server 200 receive a print command from a cellular phone 10, which is a user terminal, for a predetermined image data from among specified, stored image data, because the target managing server sends the image ID and the data indicating the storage location of said image data to the printing server 300, sets up a connection between the printing server 300 and the cellular phone 10, and causes the printing related processes to be performed, the managing server and the printing server can be provided as independent, separately constructed units. Therefore, from the standpoint of the service providers, it is possible to provide the service by constructing only the server type of one's respective field of expertise. From the standpoint of the user, it is advantageous that both the image data managing service and the image data printing service can both be received by the two servers being accessed without requiring that the user be made aware of that process.

A preferred embodiment of the image service system, the managing servers, and the image printing server according to the present invention have been explained above; however, the present invention is not limited to the above-described embodiment: so far as the gist of the present invention is not changed, various changes and additions are possible.

For example, although the according to the aforementioned embodiment the first managing server 100 and the second managing server 200 provide only the services of "display", "edit", and "print", other services, such as the promotional services described in U.S. patent application Ser. No. 10/242,770, and the like can be provided.

Further, although the image printing server 300 of the embodiment of an image service system shown in FIG. 1 sends image data or the like to a mini lab store to be printed out, the image printing server 300 can also be configured so as to temporarily store the image data on a hard disk or the like, and to transfer the stored image data on to the printing apparatus of the mini lab store when queried thereby at periodic intervals.

Still further, although according to the aforementioned embodiment the second managing server 200 is set up to permanently store image data image data specified by the user from among the image data stored in the first managing server 100, the second managing server 200 can also be set up, in accordance with the purpose for which said managing server 200 is being used, so as to store image data, from among the image data stored in the first managing server 100, of which the size is too large or which has exceeded the storage time limit of the first image managing server 100, or for which a service not provided by the first managing server 100 is desired.

Even further still, according to the embodiment of the image service system of the present invention shown in FIG. 1, the first managing server 100 and the second managing server 200 are each provided as only a single unit; however, the system can be configured so that a single second managing server stores image data satisfying predetermined conditions from a plurality of first managing servers 100.

What is claimed is:

1. An image management system comprising: an access receiving means for receiving accesses from a portable terminal apparatus having a transmitting party code and which is capable of obtaining the transmitting party code of the portable terminal apparatus, an image ID issuing means for attaching a unique image ID to image data that has been received thereby from the portable terminal apparatus through the access receiving means, and a first storage means for storing, the image data with the image ID attached thereto, for each transmitting party code.

2. An image management system as defined in claim 1, wherein the first storage means comprises: a selecting means for selecting, through a mobile electronic terminal apparatus having a transmitting party code which has access rights to image data stored in said first storage means, the desired image data from among said stored image data, a command receiving means for receiving through the mobile electronic terminal apparatus a print command for the selected image data, and a printing service implementing means for sending, when the command receiving means has received the print command, data indicating the storage location of the image data and the image ID of said image data to a image printing server capable of downloading the image data from the storage location of said image data and performing the printing related processes, connecting the image printing server to the mobile electronic terminal apparatus, and causing the printing related processes to be performed within the image printing server.

3. An image management system as defined in claim 2, wherein the mobile electronic terminal apparatus sends data indicating its model type when making access, and the first storage means comprises: a data base representing the image display capabilities of each type of mobile electronic terminal apparatus, a decoding means for decoding the data representing the model type of the accessing mobile electronic terminal apparatus to obtain the image display capability of said mobile electronic terminal apparatus, a selecting means for selecting, through a mobile electronic terminal apparatus having a transmitting party code which has access rights to image data stored in said first storage means, the desired image data from among said stored image data, a command receiving means for receiving through the mobile electronic terminal apparatus a command for displaying the selected image data, and a display means for converting, when a display command is received at the command receiving means, the format of the selected image data to a format matching the image display capabilities of the mobile electronic terminal apparatus and then displaying the image data.

4. An image management system as defined in claim 2, wherein the selection means is configured to select the desired image data from among said stored image data individually.

5. An image management system as defined in claim 1, wherein the mobile electronic terminal apparatus sends data indicating its model type when making access, and the first storage means comprises: a data base representing the image display capabilities of each type of mobile electronic terminal apparatus, a decoding means for decoding the data representing the model type of the accessing mobile electronic terminal apparatus to obtain the image display capability of said mobile electronic terminal apparatus, a selecting means for selecting, through a mobile electronic terminal apparatus having a transmitting party code which has access rights to image data stored in said first storage means, the desired image data from among said stored image data, a command receiving means for receiving through the mobile electronic terminal apparatus a command for displaying the selected image data, and a display means for converting, when a display command is received at the command receiving means, the format of the selected image data to a format matching the image display capabilities of the mobile electronic terminal apparatus and then displaying the image data.

6. An image management system as defined in claim 1, wherein the portable terminal apparatus automatically specifies a user through the transmitting party code.

7. An image management system as defined in claim 1, wherein the transmitting party code includes an ID unique to the portable terminal apparatus, whereby the portable terminal apparatus specifies the user.

8. An image management system as defined in claim 1, further comprising: a second storage means for storing image data from among the image data stored in the first storage means fulfilling predetermined conditions.

9. An image management system as defined in claim 8, wherein the second storage means further comprises: a selecting means for selecting, through a mobile electronic terminal apparatus having a transmitting party code having access rights to image data stored in said second storage means, the desired image data from among the image data stored in said second storage means, a command receiving means for receiving through the mobile electronic terminal apparatus a print command for the selected image data, and a service implementing means for sending, when the command receiving means has received the print command, the data indicating the storage location of the image data and the image ID of said image data to a image printing server capable of downloading the image data from the storage location of said image data and performing the printing related processes while connecting the image printing server to the mobile electronic terminal apparatus, and causing the printing related processes to be performed by the image printing server.

10. An image management system as defined in claim 9, wherein the mobile electronic terminal apparatus sends data indicating its model type when making access, and the second storage means comprises: a data base representing the image display capabilities of each type of mobile electronic terminal apparatus, a decoding means for decoding the data representing the model type of the accessing mobile electronic terminal apparatus to obtain the image display capability of said mobile electronic terminal apparatus, a selecting means for selecting, through a mobile electronic terminal apparatus having a transmitting party code which has access rights to image data stored in said second storage means, the desired image data from among said stored image data, a command receiving means for receiving through the mobile electronic terminal apparatus a command for displaying the selected image data, and a display means for converting, when a display command is received at the command receiving means, the format of the selected image data to a format matching the image display capabilities of the mobile electronic terminal apparatus and then displaying the image data.

11. An image management system as defined in claim 10, wherein the first storage means comprises: a selecting means for selecting, through a mobile electronic terminal apparatus having a transmitting party code which has access rights to image data stored in said first storage means, the desired image data from among said stored image data, a command receiving means for receiving through the mobile electronic terminal apparatus a print command for the selected image data, and a printing service implementing means for sending, when the command receiving means has received the print command, data indicating the storage location of the image data and the image ID of said image data to a image printing server capable of downloading the image data from the storage location of said image data and performing the printing related processes, connecting the image printing server to the mobile electronic terminal apparatus, and causing the printing related processes to be performed within the image printing server.

12. An image management system as defined in claim 11, wherein the mobile electronic terminal apparatus sends data indicating its model type when making access, and the first storage means comprises: a data base representing the image display capabilities of each type of mobile electronic terminal apparatus, a decoding means for decoding the data representing the model type of the accessing mobile electronic terminal apparatus to obtain the image display capability of said mobile electronic terminal apparatus, a selecting means for selecting, through a mobile electronic terminal apparatus having a transmitting party code which has access rights to image data stored in said first storage means, the desired image data from among said stored image data, a command receiving means for receiving through the mobile electronic terminal apparatus a command for displaying the selected image data, and a display means for converting, when a display command is received at the command receiving means, the format of the selected image data to a format matching the image display capabilities of the mobile electronic terminal apparatus and then displaying the image data.

13. An image management system as defined in claim 10, wherein the mobile electronic terminal apparatus sends data indicating its model type when making access, and the first storage means comprises: a data base representing the image display capabilities of each type of mobile electronic terminal apparatus, a decoding means for decoding the data representing the model type of the accessing mobile electronic terminal apparatus to obtain the image display capability of said mobile electronic terminal apparatus, a selecting means for selecting, through a mobile electronic terminal apparatus having a transmitting party code which has access rights to image data stored in said first storage means, the desired image data from among said stored image data, a command receiving means for receiving through the mobile electronic terminal apparatus a command for displaying the selected image data, and a display means for converting, when a display command is received at the command receiving means, the format of the selected image data to a format matching the image display capabilities of the mobile electronic terminal apparatus and then displaying the image data.

14. An image management system as defined in claim 9, wherein the first storage means comprises: a selecting means for selecting, through a mobile electronic terminal apparatus having a transmitting party code which has access rights to image data stored in said first storage means, the desired image data from among said stored image data, a command receiving means for receiving through the mobile electronic terminal apparatus a print command for the selected image data, and a printing service implementing means for sending, when the command receiving means has received the print command, data indicating the storage location of the image data and the image ID of said image data to a image printing server capable of downloading the image data from the storage location of said image data and performing the printing related processes, connecting the image printing server to the mobile electronic terminal apparatus, and causing the printing related processes to be performed within the image printing server.

15. An image management system as defined in claim 14, wherein the mobile electronic terminal apparatus sends data indicating its model type when making access, and the first storage means comprises: a data base representing the image display capabilities of each type of mobile electronic terminal apparatus, a decoding means for decoding the data representing the model type of the accessing mobile electronic terminal apparatus to obtain the image display capability of said mobile electronic terminal apparatus, a selecting means for selecting, through a mobile electronic terminal apparatus having a transmitting party code which has access rights to image data stored in said first storage means, the desired image data from among said stored image data, a command receiving means for receiving through the mobile electronic terminal apparatus a command for displaying the selected image data, and a display means for converting, when a display command is received at the command receiving means, the format of the selected image data to a format matching the image display capabilities of the mobile electronic terminal apparatus and then displaying the image data.

16. An image management system as defined in claim 9, wherein the mobile electronic terminal apparatus sends data indicating its model type when making access, and the first storage means comprises: a data base representing the image display capabilities of each type of mobile electronic terminal apparatus, a decoding means for decoding the data representing the model type of the accessing mobile electronic terminal apparatus to obtain the image display capability of said mobile electronic terminal apparatus, a selecting means for selecting, through a mobile electronic terminal apparatus having a transmitting party code which has access rights to image data stored in said first storage means, the desired image data from among said stored image data, a command receiving means for receiving through the mobile electronic terminal apparatus a command for displaying the selected image data, and a display means for converting, when a display command is received at the command receiving means, the format of the selected image data to a format matching the image display capabilities of the mobile electronic terminal apparatus and then displaying the image data.

17. An image management system as defined in claim 8, wherein the mobile electronic terminal apparatus sends data indicating its model type when making access, and the second storage means comprises: a data base representing the image display capabilities of each type of mobile electronic terminal apparatus, a decoding means for decoding the data representing the model type of the accessing mobile electronic terminal apparatus to obtain the image display capability of said mobile electronic terminal apparatus, a selecting means for selecting, through a mobile electronic terminal apparatus having a transmitting party code which has access rights to image data stored in said second storage means, the desired image data from among said stored image data, a command receiving means for receiving through the mobile electronic terminal apparatus a command for displaying the selected image data, and a display means for converting, when a display command is received at the command receiving means, the format of the selected image data to a format matching the image display capabilities of the mobile electronic terminal apparatus and then displaying the image data.

18. An image management system as defined in claim 17, wherein the first storage means comprises: a selecting means for selecting, through a mobile electronic terminal apparatus having a transmitting party code which has access rights to image data stored in said first storage means, the desired image data from among said stored image data, a command receiving means for receiving through the mobile electronic terminal apparatus a print command for the selected image data, and a printing service implementing means for sending, when the command receiving means has received the print command, data indicating the storage location of the image data and the image ID of said image data to a image printing server capable of downloading the image data from the storage location of said image data and performing the printing related processes, connecting the image printing server to the mobile electronic terminal apparatus, and causing the printing related processes to be performed within the image printing server.

19. An image management system as defined in claim 18, wherein the mobile electronic terminal apparatus sends data indicating its model type when making access, and the first storage means comprises: a data base representing the image display capabilities of each type of mobile electronic terminal apparatus, a decoding means for decoding the data representing the model type of the accessing mobile electronic terminal apparatus to obtain the image display capability of said mobile electronic terminal apparatus, a selecting means for selecting, through a mobile electronic terminal apparatus having a transmitting party code which has access rights to image data stored in said first storage means, the desired image data from among said stored image data, a command receiving means for receiving through the mobile electronic terminal apparatus a command for displaying the selected image data, and a display means for converting, when a display command is received at the command receiving means, the format of the selected image data to a format matching the image display capabilities of the mobile electronic terminal apparatus and then displaying the image data.

20. An image management system as defined in claim 17, wherein the mobile electronic terminal apparatus sends data indicating its model type when making access, and the first storage means comprises: a data base representing the image display capabilities of each type of mobile electronic terminal apparatus, a decoding means for decoding the data representing the model type of the accessing mobile electronic terminal apparatus to obtain the image display capability of said mobile electronic terminal apparatus, a selecting means for selecting, through a mobile electronic terminal apparatus having a transmitting party code which has access rights to image data stored in said first storage means, the desired image data from among said stored image data, a command receiving means for receiving through the mobile electronic terminal apparatus a command for displaying the selected image data, and a display means for converting, when a display command is received at the command receiving means, the format of the selected image data to a format matching the image display capabilities of the mobile electronic terminal apparatus and then displaying the image data.

21. An image management system as defined in claim 8, wherein the first storage means comprises: a selecting means for selecting, through a mobile electronic terminal apparatus having a transmitting party code which has access rights to image data stored in said first storage means, the desired image data from among said stored image data, a command receiving means for receiving through the mobile electronic terminal apparatus a print command for the selected image data, and a printing service implementing means for sending, when the command receiving means has received the print command, data indicating the storage location of the image data and the image ID of said image data to a image printing server capable of downloading the image data from the storage location of said image data and performing the printing related processes, connecting the image printing server to the mobile electronic terminal apparatus, and causing the printing related processes to be performed within the image printing server.

22. An image management system as defined in claim 21, wherein the mobile electronic terminal apparatus sends data indicating its model type when making access, and the first storage means comprises: a data base representing the image display capabilities of each type of mobile electronic terminal apparatus, a decoding means for decoding the data representing the model type of the accessing mobile electronic terminal apparatus to obtain the image display capability of said mobile electronic terminal apparatus, a selecting means for selecting, through a mobile electronic terminal apparatus having a transmitting party code which has access rights to image data stored in said first storage means, the desired image data from among said stored image data, a command receiving means for receiving through the mobile electronic terminal apparatus a command for displaying the selected image data, and a display means for converting, when a display command is received at the command receiving means, the format of the selected image data to a format matching the image display capabilities of the mobile electronic terminal apparatus and then displaying the image data.

23. An image management system as defined in claim 8, wherein the mobile electronic terminal apparatus sends data indicating its model type when making access, and the first storage means comprises: a data base representing the image display capabilities of each type of mobile electronic terminal apparatus, a decoding means for decoding the data representing the model type of the accessing mobile electronic terminal apparatus to obtain the image display capability of said mobile electronic terminal apparatus, a selecting means for selecting, through a mobile electronic terminal apparatus having a transmitting party code which has access rights to image data stored in said first storage means, the desired image data from among said stored image data, a command receiving means for receiving through the mobile electronic terminal apparatus a command for displaying the selected image data, and a display means for converting, when a display command is received at the command receiving means, the format of the selected image data to a format matching the image display capabilities of the mobile electronic terminal apparatus and then displaying the image data.

* * * * *